United States Patent
Gomez et al.

(10) Patent No.: US 11,505,099 B2
(45) Date of Patent: Nov. 22, 2022

(54) SEAT TRIM STRUCTURE, SEAT STRUCTURE AND SEAT MOUNTING STRUCTURE FOR A SEAT OF A VEHICLE

(71) Applicant: Adient Engineering and IP GmbH, Burscheid (DE)

(72) Inventors: John J. Gomez, Howell, MI (US);
James D. Biebel, Milford, MI (US);
Raza Bashir, Sterling Heights, MI (US); Joseph Gasko, Commerce Charter Township, MI (US); Dalibor Dimovski, Macomb, MI (US); Kurt A. Seibold, Farmington Hills, MI (US);
Xin Wei Jolene Ng, Plymouth, MI (US); John Bleau, Plymouth, MI (US);
Walter Daniel Merchant, Canton, MI (US); Raymond Anthony Iavasile, Beverly Hills, MI (US)

(73) Assignee: Adient US LLC, Plymouth, MI (US)

( * ) Notice: Subject to any disclaimer, the term of this patent is extended or adjusted under 35 U.S.C. 154(b) by 174 days.

(21) Appl. No.: 16/734,662

(22) Filed: Jan. 6, 2020

(65) Prior Publication Data
US 2020/0215944 A1 Jul. 9, 2020

Related U.S. Application Data

(60) Provisional application No. 62/788,996, filed on Jan. 7, 2019.

(51) Int. Cl.
| | |
|---|---|
| *B60N 2/60* | (2006.01) |
| *B60N 2/01* | (2006.01) |
| *B60N 2/20* | (2006.01) |
| *B60N 2/10* | (2006.01) |
| *B60N 2/005* | (2006.01) |
| *B60N 3/00* | (2006.01) |

(Continued)

(52) U.S. Cl.
CPC ............ *B60N 2/6027* (2013.01); *B60N 2/005* (2013.01); *B60N 2/012* (2013.01); *B60N 2/10* (2013.01); *B60N 2/16* (2013.01); *B60N 2/20* (2013.01); *B60N 2/5621* (2013.01); *B60N 2/753* (2018.02); *B60N 2/79* (2018.02); *B60N 3/004* (2013.01); *B60R 7/043* (2013.01); *B60R 22/20* (2013.01); *B60R 22/26* (2013.01); *B60N 2/797* (2018.02); *B60N 3/002* (2013.01); *G05D 1/021* (2013.01)

(58) Field of Classification Search
CPC ...... B60N 2/6027; B60N 2/0284; B60N 2/16; B60N 2002/0288
USPC ....... 297/452.4, 218.5, 218.1, 284.9, 440.22, 297/284.11, 284.1
See application file for complete search history.

(56) References Cited

U.S. PATENT DOCUMENTS

| | | | | |
|---|---|---|---|---|
| 1,400,717 A | * | 12/1921 | Benson | .................... B60N 2/60 |
| | | | | 297/452.4 |
| 4,746,168 A | * | 5/1988 | Bracesco | ............... B60N 2/665 |
| | | | | 297/284.6 |

(Continued)

*Primary Examiner* — Milton Nelson, Jr.
(74) *Attorney, Agent, or Firm* — Marshall & Melhorn, LLC

(57) ABSTRACT

The disclosure relates to a seat trim structure for a vehicle seat with at least a mounting element having a plurality of integrated retaining elements, a number of detachable support members, and a number of detachable trim elements. The support members may be detachably arranged to the mounting element and the integrated retaining elements may be configured to detachably retain the number of trim elements to the mounting element.

17 Claims, 15 Drawing Sheets

(51) Int. Cl.
*B60N 2/75* (2018.01)
*B60N 2/16* (2006.01)
*B60R 7/04* (2006.01)
*B60R 22/20* (2006.01)
*B60R 22/26* (2006.01)
*B60N 2/56* (2006.01)
*G05D 1/02* (2020.01)

(56) References Cited

U.S. PATENT DOCUMENTS

| | | | | |
|---|---|---|---|---|
| 4,861,104 A * | 8/1989 | Malak | ............ | B60N 2/5825 |
| | | | | 297/218.3 |
| 6,176,543 B1 * | 1/2001 | Nawata | ............ | B60N 2/4228 |
| | | | | 296/68.1 |
| 6,634,718 B2 * | 10/2003 | Matsuo | ............ | A47C 7/18 |
| | | | | 297/452.18 |
| 9,555,728 B2 * | 1/2017 | Galbreath | ............ | B60N 2/2866 |
| 2003/0214166 A1 * | 11/2003 | Schambre | ............ | B60N 2/643 |
| | | | | 297/284.1 |
| 2012/0326478 A1 * | 12/2012 | Blind | ............ | B60N 2/62 |
| | | | | 297/284.3 |
| 2015/0217868 A1 * | 8/2015 | Gonnsen | ............ | B60N 2/643 |
| | | | | 297/354.1 |

* cited by examiner

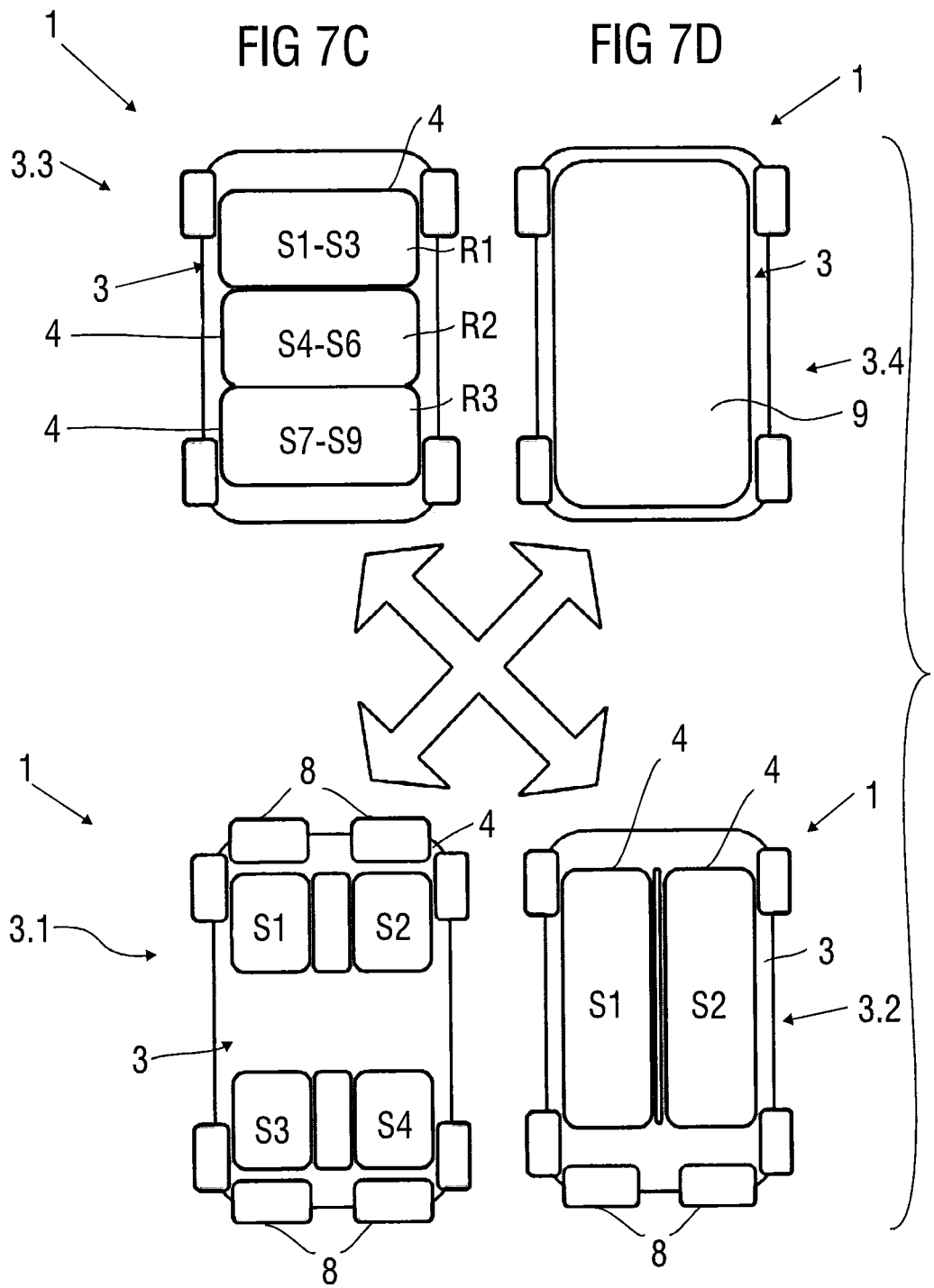

SEAT TRIM STRUCTURE, SEAT STRUCTURE AND SEAT MOUNTING STRUCTURE FOR A SEAT OF A VEHICLE

BACKGROUND OF THE DISCLOSURE

The present disclosure relates generally to a removable seat trim structure for a seat, a removable seat structure for a seat and a removable seat mounting structure for a vehicle. Further, the present disclosure relates to a seat arrangement having plurality of seat assemblies.

Automotive vehicles have a seat arrangement which may include one or more seat assemblies having a seat structure and a seat trim structure comprising a seat cushion and a seat back for supporting a passenger or occupant above a vehicle floor and a seat mounting structure for mounting the seat structure to the vehicle floor, e.g. a vehicle's frame floor structure or vehicle's body frame structure. Each of the seat cushion and seat back commonly comprise a base foam pad supported by a rigid frame structure and covered by a textile trim cover of cloth, leather, and/or vinyl. The base foam pad provides firm support and durability to the seat cushion and seat back. A trim foam pad, commonly referred to as a plus pad, also is frequently disposed between the base foam pad and the trim cover to provide a softer surface for seat occupant comfort and to improve the appearance of the seat

SUMMARY OF THE DISCLOSURE

It is an object of the present disclosure to provide an improved seat trim structure and an improved seat structure for a vehicle seat. For instance, the present disclosure relates to an improved seat trim structure and an improved seat structure for serviceability of a seat of a vehicle, e.g. an autonomous driving vehicle. It is an object of a further disclosure to provide an improved seat mounting structure for a vehicle. For instance, the further present disclosure relates to an improved seat mounting structure for a vehicle, e.g. an autonomous driving vehicle.

According to a first disclosure, there is provided a seat trim structure for a seat, in particular for replaceable attachment of at least one trim element to the seat, wherein the seat trim structure comprises at least a mounting element having a number of integrated retaining elements, a number of detachable support members, and a number of detachable trim elements, wherein at least one of the support members is detachably arranged to the mounting element and at least one of the trim element is detachably arranged to said support member wherein said trim element is detachably fixed to the mounting element by the integrated retaining elements.

For example, at least one support member is loosely arranged on the mounting element. Said support member sits on the mounting element when arranged on the mounting element. Said support member is simply removable from the mounting element. For instance, said support member is removable after the attachment of trim element to the mounting element is loosened and the trim element is detached from the mounting element. That means that said trim element is retained on the mounting element such that said support member is fixedly held on the mounting element and between the mounting element and the trim element.

According to an exemplary embodiment, the seat trim structure may comprise more than one support members for one seat, e.g. a lower support member, for instance a seat cushion panel or seat cushion pad, a middle support member, for instance a seat back cushion pad or panel.

Furthermore, the seat trim structure may comprise more than one trim element for one seat, e.g. a lower trim element, for instance a seat cushion trim element, a middle trim element, for instance a backrest trim element.

According to a further aspect, at least one of the support member or trim element has a seating surface having a curved shape. The curved shape allows multiple seating positions and particularly allows occupants to position themselves at 10° to 20° angle to moving direction of the vehicle allowing interactions with other occupants, e.g. neighboring occupants or occupants sitting opposite, and/or privacy from occupants facing in opposite rows of seats.

According to another aspect, there is provided a seat structure for a vehicle, in particular for simplicity of kinematic of a seat, wherein the seat structure comprises at least a main frame formed by a plurality of frame elements, wherein at least one of the frame elements is configured variably extendable to allow at least one of variable length, variable width or variable height of the main frame. In particular, the seat structure is simply variable adjustable for smallest to largest occupants and allows a comfortable accommodation of smallest or largest occupants.

Furthermore, the seat structure may be assembled to a seat mounting structure and/or a vehicle frame structure in a given angle range, e.g. between 0° to 20°, in particular between 10° to 15°. Such limited angled positioning of the seat structure with respect to the vehicle frame structure allows a comfortable position of the occupant to the neighboring, e.g. center sitting occupant. This angled positioning, e.g. 15°-angled positioning of the seat structure with respect to the vehicle frame structure, e.g. within the seat mounting structure, keeps the occupants line of sight on the center of the vehicle interior across from them and not directly across into the eyes of occupants directly sitting across from them. In shared vehicle scenarios people that do not know one another feel more comfortable when not positioned with direct eye contact straight across from each other.

Furthermore, the seat structure may be provided without an integrated recliner mechanism. In an exemplary embodiment, a recliner mechanism is configured attachable to the seat structure. In particular, the recliner mechanism is a separate recliner attachment which can be linked to the seat structure.

According to another aspect, there is provided a seat structure for a vehicle seat, in particular for detachable attachment of a seat trim structure to a main frame, wherein the seat structure comprises at least a main frame and a seat trim structure, wherein the seat trim structure comprising at least a mounting element having a plurality of integrated retaining elements, a number of detachable support members, and a number of detachable trim elements, wherein at least one of the support members is detachably arranged to the mounting element and wherein the integrated retaining elements are configured to detachably retain at least one of the trim elements to the mounting element, and wherein the seat trim structure is detachably attached to the main frame.

In particular, the support member and the trim element each of them is configured as a one-piece element forming the seat cushion and the backrest of a seat.

In an exemplary embodiment, the seat structure is configured as a mono structure design for a single seat. Due to the variably adjustment of the seat structure by extendable frame elements no recliner mechanism is needed.

According to a further disclosure, a seat structure, in particular a mounting structure for a vehicle seat comprises at least a main frame for mounting a seat pan and/or a backrest. The seat structure, in particular a frame structure, may comprise struts, beams, tubes, pipes, rods, bars, planes, pads. The seat structure may be supported by axially extendable struts, e.g. vertical or cross bearing struts or tubes and/or vertical or cross load struts or tubes, and/or coupled pivot mechanism. Such support assemblies allow highly adjustable seating position in regards to tilt and height relative to the vehicle floor. Further, accommodating variety of seating positions to occupant statue and simply adjustment of the seat into seating positions allow easy removal of the seat structure (seat frame) from the seat mounting structure (assembling/bearing frame). Further, trim elements, control devices and other auxiliary units may be integrated to the seat structure, e.g. the seat frame, to simply adjust and attach the seat structure via pivot points of struts, tubes.

Further, the seat structure comprises a mounting substrate element having a plurality of integrated retaining elements, such as retaining channels, wherein the mounting substrate element is detachable attached to the main frame and wherein the integrated retaining elements are configured to detachable retain a number of trim elements. For instance, the mounting substrate element is a removable trim shell skeleton for trim cover elements or trim sub-assemblies of the vehicle seat. The mounting substrate element can be exchanged without having to remove structural components from the seat and/or the vehicle. The mounting substrate element provides enough structural integrity to be trimmed independent from the main frame. Multiple trim elements or components can be stacked and swapped out quickly by a (fleet) service provider when required.

For example, the mounting substrate element is formed with a 3D-printing method utilizing trim retaining elements, such as trim channel retainers for trim attachment. The mounting substrate element could be manufactured with any traditional method. The mounting substrate element comprises a shape corresponding with a shape of the main frame.

The mounting substrate element holds a foam element and the trim cover (upholstery) of the seat. The mounting substrate element is for instance clipped in and attached to the main frame. In another embodiment, trim elements, in particular trim shell components for/around the seat, are clipped to the retaining elements and are designed to be interchanged when needed for personalization or damage replacement needs. The trim is broken into key sections, i.e. trim elements, allowing the service provider to exchange only the damaged or worn portions of the seat trim. The trim elements can be personalized through the service provider and easily stack in a warehouse.

According to a further aspect, there is provided a seat mounting structure for a vehicle, in particular for mounting at least one seat, in particular for mounting three seats, within a vehicle to create a rear row or a front row. The seat mounting structure comprises a seat rib cage which is configured to attach to the vehicle frame and which comprises integrated seat mounting points, vehicle structure mounting points and mounting locations for seat adjusting devices, a seat structure comprising at least a main frame and a seat trim structure, wherein the main frame is fastened to the seat rib cage by said seat mounting points in such a manner that the seat structure is relatively movable with respect to the seat rib cage by said seat adjusting devices.

According to another aspect, a seat mounting structure for mounting at least one seat, in particular for mounting three seats, within a vehicle to create a rear row or a front row. For example, the vehicle is an autonomous driving vehicle configured to autonomously pick up and transport occupants, wherein a passenger compartment, for instance, can be designed in a more comfortable and luxury way for the occupants. The seat mounting structure comprises a seat rib cage which is configured cantilevered and which comprises integrated seat mounting points to mount at least one seat to the seat rib cage and vehicle structure mounting points for mounting the seat rib cage to the vehicle or rather to a vehicle chassis. Further, the seat rib cage comprises mounting locations for seat adjusting devices, such as seat pivot and movement devices and cable and wire assembly, e.g. cable trays, cable guidances, wire trays, wire guidances.

The seat rib cage is configured as a universal mounting structure to the vehicle. The seat rib cage is configured for bulkhead style seat mounting to the vehicle. This style of mounting on e.g. a vertical wall frees up space for batteries located in a vehicle floor.

In particular, the seat rib cage is arranged on the vehicle floor and extends in a transverse direction across the vehicle floor. For example, the seat rib cage is formed in a U-shaped manner, wherein the seat or seats is/are arranged between the parallel running distanced legs of the U-shaped seat rib cage. The seat rib cage comprises a frame structure which packages the seat mounting points off the vehicle floor and to a bulkhead style beam that runs cross-car. For instance, a connection portion of the two legs forms said bulkhead style beam. The legs of the U-shaped seat rib cage form integral side impact beams for passenger safety. In another embodiment, a front loading latch system is provided within the vehicle, in particular within the passenger compartment, for allowing service providers to quickly install and remove set of seats from an interior of the vehicle with a sliding seat fixture. The seat mounting structure is configured flexible, lightweight and easily installable and removable. Further, the seat rib cage meets structural requirements for so-called ABTS (all belts to seat) loads and provides additional passenger safety with strategically positioned cross-car, transverse running beams and longitudinal running, side beams to protect occupants.

According to another disclosure, a center seating module for a vehicle comprises a stationary lower frame structure and a stationary upper frame structure which is coupled to the lower frame structure. The lower frame structure comprises a reversed U-shaped form for carrying a seat pan whilst providing storage space underneath the seat pan. In particular, the storage space is provided between the two spaced apart and parallel running legs of the U-shaped lower frame structure. The seat pan is attached to the connection portion of the two legs. Further, the upper frame structure comprises an adjustment device and a movable backrest shell, wherein the adjustment device is configured to adjust the backrest shell into an armrest and/or table position. The movable backrest shell can be transformed into a useable armrest and/or table. In particular, the adjustment device is configured to lock the backrest shell in a desired vertical position as well as in a desired tilted position for improved comfort feeling. The storage space can be used for storing a beverage and/or snack bar if requested, for bags or other occupant belongings. Moreover, an integral underseat storage bin with a slide-out feature for greater access can be arranged within the storage space. In a further embodiment, the center seating module can be used as vehicle integrated booster seat for toddlers. Furthermore, such center seating module is easily serviceable, comprises a modular flexible design, is designed lightweight and provides an additional seating space, storage space or occupant comfort component when required. Further, the center seating module, such as a center seat positioned between two seats within a vehicle, comprises a so-called ABTS (all belts to seat) structure whilst providing comparatively efficient packaging. Moreover, the center seating module is configured to retain removable components and trim substrates. For example, the center seating module comprises several integral mounting clips, wherein some of them are configured to lock the center seating module to the vehicle and other ones are configured to retain seat components which can be added or exchanged.

According to a further disclosure, an occupant support component for a vehicle seat comprises at least a support element comprising at least an L-shaped upper portion and a U-shaped side portion. In particular, one of the legs of the U-shaped portion and one of the legs of the L-shaped portion are configured as an integral, merged part. The support element is configured as one-piece part. The L-shaped upper portion is configured to be arranged on an upper surface of the backrest and the U-shaped side portion is configured to be used as an armrest and which comprises a number of control devices, e.g. control panels, control displays, touch screens, control buttons. For instance, the support element is formed as wrap around shelf or rail-like element developed to accommodate an occupant and to provide an additional level of comfort be letting the occupant position his arm in a higher position compared to common armrest heights.

The support element enables various control devices to be integrated into the seat (unlike conventional automotive seat configuration), e.g. placing control devices in door panels and/or instrument panel.

The control devices are, for instance, a so-called HMI device for seat control, venting ducts or heating devices and ambient/information LED-lighting devices. The control devices are positioned in an ideal location for an occupant of all sizes to access within reach. In particular, some of the control devices are configured as integral/integrated devices. For example, the support element is a 3D manufactured part into which the control devices are built. The support element can be further built or manufactured with traditional process, too, e.g. by injection moulding.

According to the another disclosure, an information device for a vehicle seat comprises at least one lighting device, such as LED and/or LED strip, which is configured to be activated to inform at least an occupant about one of a seating reservation and/or a direction of travel and/or dynamic motions and/or task related activities. Additionally, the lighting device is configured as ambient lighting. In particular, shared mobility scenarios will require seating reservation information that helps occupants to identify their reserved seat in the vehicle. Moreover, the information device informs occupants of sudden vehicle stops and overall direction of travel. For instance, user specified color lighting is activated under the seat when the occupant enters the vehicle. In another embodiment, the lighting device is arranged under the seat. For instance, a lighting strip is packaged underneath the seat and another lighting strip is packed in a backrest and/or side area of the seat, in particular out of sight. The lighting device provides a plurality of color choices for different identification methods. The lighting device provides visual guidance as well as ambient light for mood setting or task related activities.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein:

FIG. 7 shows a top view of four replaceable embodiments of an interior of the vehicle using the seat mounting structure to provide different seat arrangements with different functions, e.g. for comfort seating, for basic economy seating, for premium seating, for cargo containment, FIG. 7A shows a top view of a first embodiment of an interior of the vehicle using the seat mounting structure to provide a comfort seating, FIG. 7B shows a top view of a second embodiment of an interior of the vehicle using the seat mounting structure to provide a premium seating, FIG. 7C shows a top view of a third embodiment of an interior of the vehicle using the seat mounting structure to provide a basic economy seating, FIG. 7D shows a top view of a fourth embodiment of an interior of the vehicle using the seat mounting structure to provide cargo containment.

Corresponding parts are marked with the same reference symbols in all figures.

DETAILED DESCRIPTION OF PREFERRED EMBODIMENTS

Figure 1:
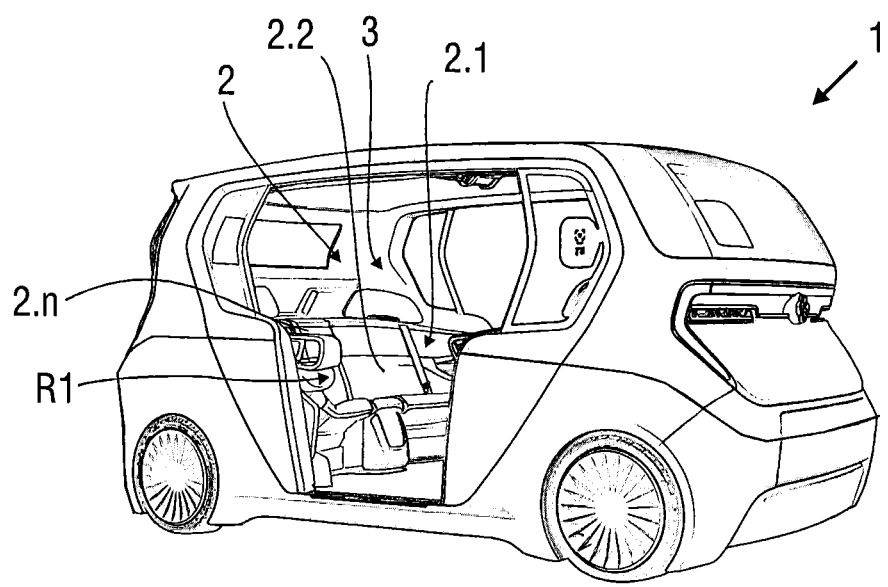
FIG. 1 shows a perspective view of a vehicle comprising a seat arrangement having a plurality of seat assemblies.

FIG. 1 shows a perspective view of an exemplary embodiment of a vehicle 1 comprising a seat arrangement 2 having a plurality of seat assemblies 2.1 to 2.n arranged in a row R1, e.g. a rear row R1. The vehicle 1 is for example an autonomous driving vehicle configured to autonomously pick up and transport occupants. A vehicle interior 3 can be designed as a passenger compartment in more economy way, comfortable way or luxury way for the occupants or as a loading or storage compartment vehicle.

Figure 2:
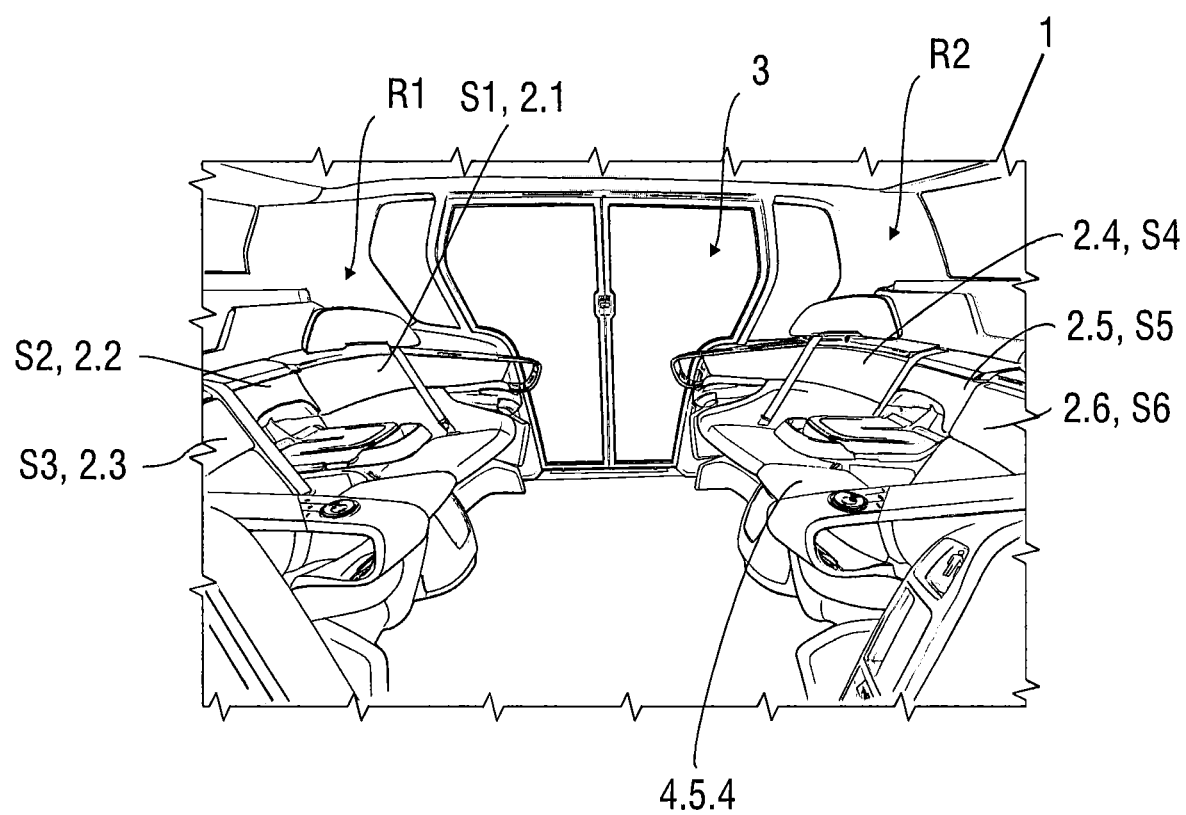
FIG. 2 shows a perspective view of a vehicle interior having at least two rows of a plurality of seat assemblies facing each other.

FIG. 2 shows a perspective view of a vehicle interior 3 having at least two rows R1, R2, e.g. a rear row R1 and a front row R2, of a plurality of seat assemblies 2.1 to 2.6 of seats S1 to S6. Each of the rows R1 and R2 comprises three seat assemblies 2.1 to 2.3 and 2.4 to 2.6 wherein the seat assemblies 2.1 to 2.3 and 2.4 to 2.6 of the rows R1 and R2 are facing each other. Center seat 2.5 is in an armrest position. A storage bin 4.5.4 is shown in a closed position (continues line) and in an opened position (dotted line).

Figure 3:
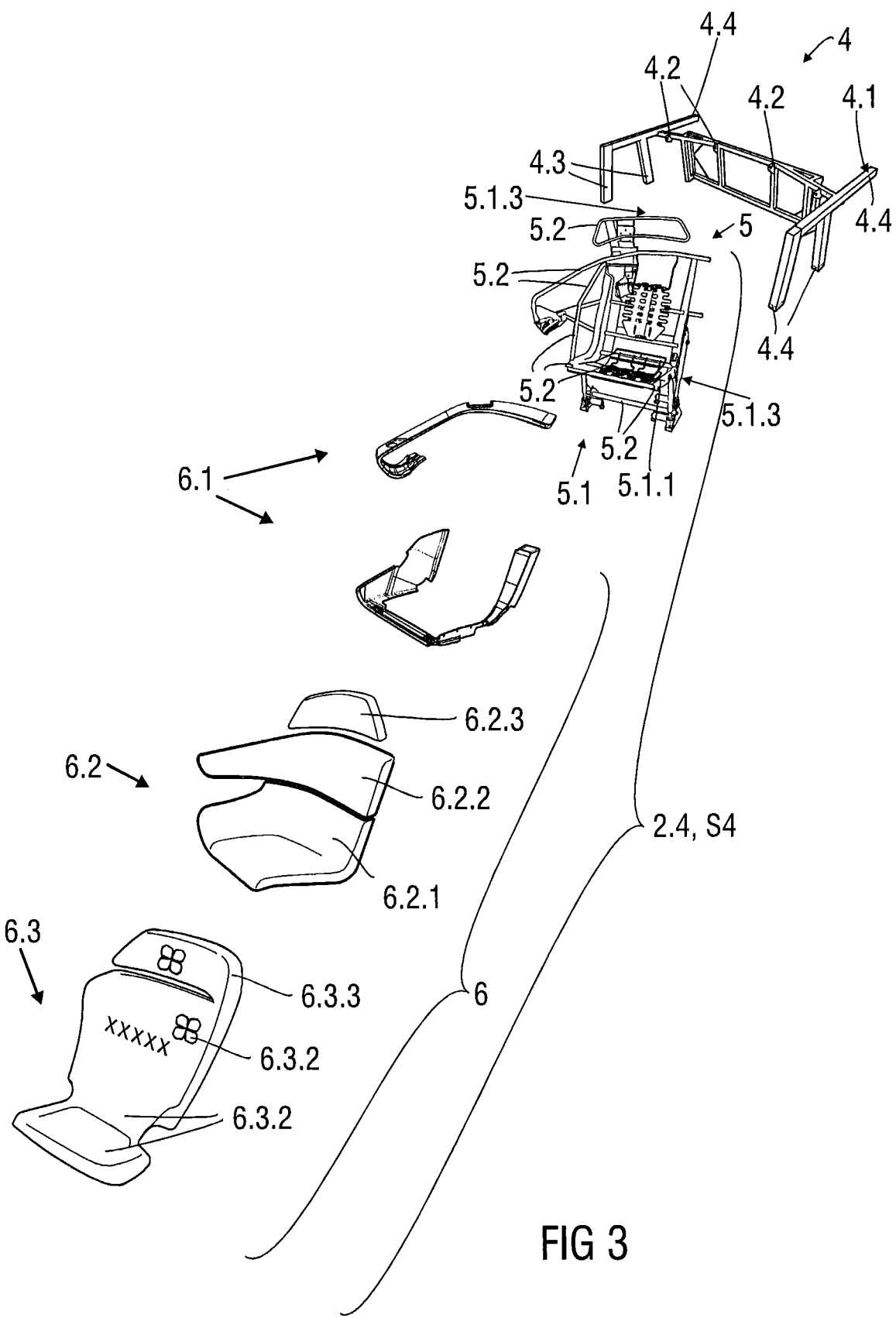
FIG. 3 shows an exploded view of a seat assembly comprising at least a seat mounting structure, seat structure and a seat trim structure comprising a mounting element, a detachable support member and a detachable trim element.

FIG. 3 shows an exploded view of an exemplary embodiment of one of the seat assemblies 2.n, e.g. seat assembly 2.4. The seat assembly 2.4 comprises at least a seat mounting structure 4, a seat structure 5 and a seat trim structure 6 comprising a mounting element 6.1, a detachable support member 6.2 and a detachable trim element 6.3.

The seat mounting structure 4 is fixed to a frame, a floor or a chassis of the vehicle 1. The seat mounting structure 4 is configured e.g. as a seat rib cage 4.1, to attach and retain the seat structure 5 of the respective seat S4 of the seat assembly 2.4 on it. In particular, the seat mounting structure 4 is provided for mounting seats S within the vehicle 1. The seat mounting structure 4 is configured to attach to the vehicle frame.

In the shown embodiment, the seat rib cage 4.1 can be configured to retain at least one seat structure 5 of at least one respective seat S4. Alternatively, the seat rib cage 4.1 can be configured to retain more than one seat structures 5 of two or three respective seats S1 to S3 or S4 to S6 of one of the rows R1 or R2 or with a special mounting bracket or other auxiliary units 5.6, e.g. a bracket for a wheel chair to hold the chair in place.

The seat mounting structure 4 comprises seat mounting points 4.2 to detachably mount the seat structure 5 to the seat mounting structure 4 e.g. by screws or rivets.

The seat rib cage 4.1 may be formed by a plurality of mounting elements 4.3, e.g. ribs 4.7, tubes, pipes and/or bearing beams, which are connected with each other, e.g. welded, bolted or screwed.

The seat rib cage 4.1 further comprises a plurality of vehicle structure mounting points 4.4 to detachably attach it to the floor or chassis within the vehicle interior 3 of the vehicle 1.

The seat structure 5 is configured for example as a main frame 5.1, e.g. a seat supporting frame made of at least one of metal or composite or hybrid material. The main frame 5.1 may be formed by a plurality of frame elements 5.2, e.g. ribs 4.7, tubes, pipes and/or bearing beams, brackets, attachments, which are connected with each other, e.g. welded, bolted or screwed. The plurality of structures, e.g. struts, ribs 4.7, tubes, pipes, attachments of support elements, brackets, can be formed of composite or hybrid materials e.g. molded as a whole part or unit or can be configured as separated elements or components bonded together to form a complete main frame 5.1.

In particular, at least one of the frame elements 5.2 is configured variably extendable to allow at least one of variable length, variable width or variable height of the main frame 5.1. Thus, the seat structure 5 is simply variable adjustable for smallest to largest occupants.

The seat structure 5, in particular a frame structure, may comprise struts, beams, tubes, pipes, rods, bars, planes, pads. The seat structure 5 may be supported by axially extendable struts, e.g. vertical bearing tubes 5.3 and/or cross bearing tubes, and/or lower, middle or upper frame part 5.1.1 to 5.1.3. The middle frame part 5.1.2 may further comprise a pivot mechanism to movably arrange and hold the seat S with respect to the vehicle floor. Such additional bearing tubes 5.3 or lower, middle or upper frame parts 5.1.1 to 5.1.3 allow highly adjustable seating positions of the seat S in regards to tilt and height movement relative to the vehicle floor.

In particular, the seat structure 5 may be provided without an integrated recliner mechanism. In an exemplary embodiment, a recliner mechanism may be configured to attach to the seat structure 5. In particular, the recliner mechanism may be configured as a separate recliner attachment which can be linked to the seat structure 5.

The seat trim structure 6 is configured to detachably attach it to the main frame 5.1.

In an exemplary embodiment, the seat trim structure 6 comprises the mounting element 6.1 to which one or more support members 6.2 may be detachably arrange wherein one or more trim elements 6.3 may be arranged onto one or more of the support members 6.2 and detachably attached to the mounting element 6.1.

The seat S4 may comprise three separate support members 6.2.1 to 6.2.3, e.g. a lower support member 6.2.1, e.g. a seat cushion panel or seat cushion pad, a middle support member 6.2.2, e.g. a seat back cushion pad or seat back cushion panel, an upper support member 6.2.3, e.g. a head restraint cushion pad. In particular the support members 6.2.1 to 6.2.3 are configured as foam pads, e.g. cushion panel or cushion pads. The support members 6.2.1 to 6.2.3 may be produced by a 3D printing process.

The trim element 6.3 may be configured as a one-piece element for the whole seat S4. The trim element 6.3 may be formed by a material of one or more of a vinyl, fabric, and/or leather. Further, the trim element 6.3 may be configured as a trim cover having a curved profile.

The seat S4 may comprise three separate trim elements 6.3.1 to 6.3.3, e.g. a lower trim element 6.3.1, e.g. a seat cushion panel or seat cushion pad, a middle trim element 6.3.2, e.g. a seat back cushion pad or seat back cushion panel, an upper trim element 6.3.3, e.g. a head restraint cushion pad. In particular the trim elements 6.3.1 to 6.3.3 are configured as trim covers.

The trim element 6.3 can be replaced easily by detaching from the mounting element 6.1 to individualize or customize the respective seat S4, e.g. by different prints or watermarks onto a front surface 6.2.6 of different trim elements 6.3. The mounting element 6.1 is for instance configured as a mounting substrate element produced by a 3D printing process or injection moulding process.

In particular, each of the support members 6.2.1 to 6.2.3 comprise a rear surface 6.2.7 and a front surface 6.2.6 wherein the rear surface 6.2.7 of each support members 6.2.1 to 6.2.3 is detachably arranged to a front surface 6.2.6 of the mounting element 6.1 and a rear surface 6.2.7 of the trim element 6.3 is detachably arranged to the front surfaces 6.2.6 of the support members 6.2.1 to 6.2.3 and attached to the mounting element 6.1.

Further, the support members 6.2.1 to 6.2.3 are made of foam, e.g. polyurethane foam, viscose elastic foam.

Figure 4:
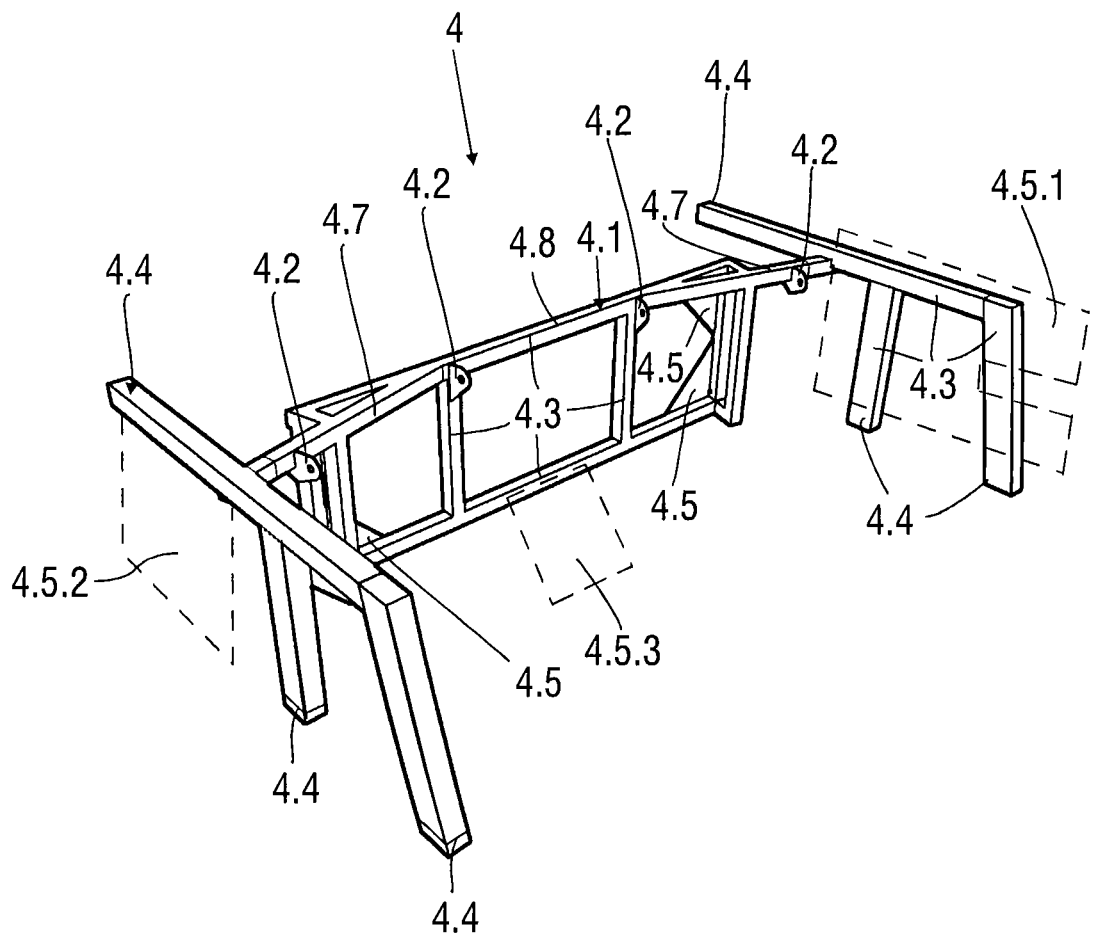
FIG. 4 shows a perspective view of a seat mounting structure for a vehicle.

FIG. 4 shows a perspective view of an exemplary embodiment of the seat mounting structure 4 for different interior types 3.1 to 3.4 of a vehicle 1 shown in FIGS. 7, 7A to 7O.

The seat mounting structure 4, in particular the seat rib cage 4.1, is configured as a universal mounting rib cage for multiple seating and storage applications and configurations.

The seat mounting structure 4 comprises the seat rib cage 4.1 which is configured cantilevered and which comprises integrated seat mounting points 4.2 to mount at least one seat structure 5 as shown in FIG. 5 to the seat rib cage 4.1 and vehicle structure mounting points 4.4 for mounting the seat rib cage 4.1 to the floor or chassis of the vehicle 1 to provide one of the different interior types 3.1 to 3.4.

Further, the seat rib cage 4.1 comprises optional mounting locations 4.5 to mount seat adjusting devices 4.6 as shown in FIGS. 5, 6, such as seat pivot and movement devices.

One of the mounting locations 4.5 is configured as a loading track assembly 4.5.1 to assemble and position a seat assembly 2.4, in particular the respective seat structure 5 of e.g. seat S4, into an assembling position to assemble the seat S4 in a correct position onto the seat rib cage 4.1. The seat rib cage 4.1 can further comprise optional carrier 4.5.2, e.g. mounting plates, ribs, panels to mount an armrest, optional center carrier 4.5.3 e.g. to mount a center seat S5.

The seat rib cage 4.1 is configured as a universal mounting structure for two or three seat assemblies 2.4 to 2.6 to provide different interior types 3.1 to 3.4.

The seat rib cage 4.1 is shaped as a bulkhead style seat mounting structure 4 which frees up space for batteries located in a vehicle floor. In particular, the seat rib cage 4.1 is arranged on the vehicle floor and extends in a transverse direction of the vehicle floor.

For example, the seat rib cage 4.1 is formed in a U-shaped manner, wherein the seat or seats S1 to S6 is/are arranged between the parallel running distanced legs of the U-shaped seat rib cage 4.1.

The seat rib cage 4.1 comprises a frame structure which packages the seat mounting points 4.2 off the vehicle floor and to a bulkhead style beam that runs cross-car. For instance, a connection portion of the two legs forms said bulkhead style beam. The legs of the U-shaped seat rib cage 4.1 form integral side impact beams for passenger safety.

In another embodiment, a not shown front loading latch system is provided within the vehicle 1, in particular within the vehicle interior 3 or passenger compartment, for allowing service providers to quickly install and remove set of seats S1 to S6 from one of the vehicle interiors 3 of the vehicle 1 with a sliding seat fixture to provide different interior types 3.1 to 3.4.

In particular, the seat rib cage 4.1 is configured to arrange and hold three seat structures 5 of seats S1 to S3 or S4 to S6 next to each other in such a manner that at least one outboard seat S1, S3, S4 or S6 is inwardly angled with respect to the respective center seat S2 or S5. For example, the outboard seat S1, S3, S4 or S6 is inwardly angled with respect to the center seat S2 or S5 in an angle range between 0 degrees to 20 degrees, in particular at an angle of 15 degrees.

To provide this inwardly angled positioning of outboard seats S1, S3, S4 or S6 within the seat rib cage 4.1 the mounting points 4.2 for the outboard seats S1, S3, S4 or S6 are arranged on ribs 4.7 which are angled with respect to a cross base frame 4.8.

Figure 5A:
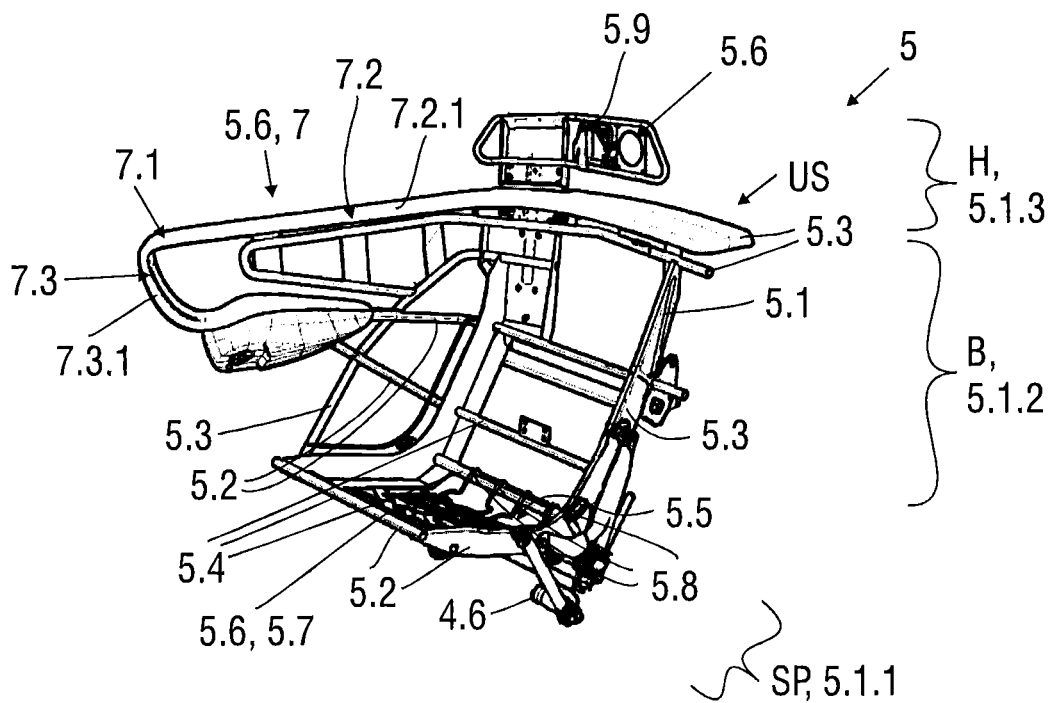
FIG. 5A shows a perspective view of a first embodiment of a seat structure which is mountable to the seat mounting structure according to FIG. 4.
Figure 5B:
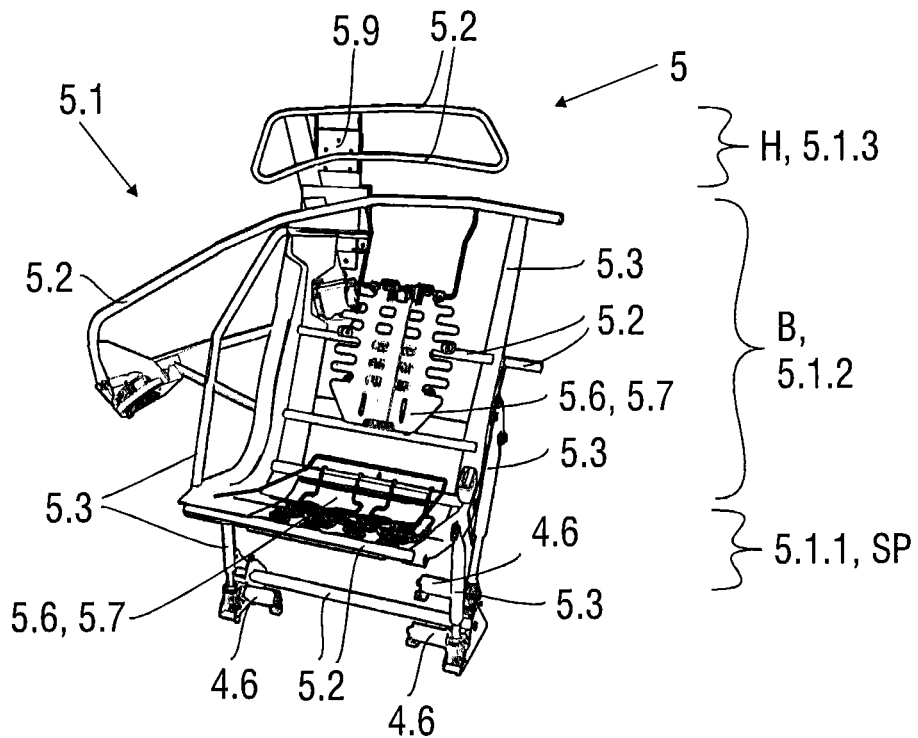
FIG. 5B shows a perspective view of a second embodiment of a seat structure which is mountable to the seat mounting structure according to FIG. 4.

FIGS. 5A, 5B show different embodiments of a seat structure 5. The seat structure 5 comprises a main frame 5.1, e.g. a seat supporting frame, made of at least one of metal or composite material. The main frame 5.1 may be formed by a plurality of frame elements 5.2, e.g. ribs, tubes, pipes and/or bearing beams, which are connected with each other, e.g. welded, bolted, attached or screwed.

The seat structure 5 is mountable to the seat mounting structure 4. The seat structure 5 can be assembled priority to the vehicle frame or chassis. The seat mounting structure 4 is integrated into the vehicle structure, e.g. chassis or frame. The seat mounting structure 4 forms an integrated part of the vehicle structure. Alternatively the seat mounting structure 4 may be a separately attached unit. In particular, the seat mounting structure 4 may be an assembly unit which is e.g. welded to the vehicle structure.

The seat structure 5 of outer seats S, e.g. of seat S1, S3, S4 or S6, may be assembled to the seat mounting structure 4 and/or the vehicle frame structure in a given angle range, e.g. between 0 degree to 20 degrees, in particular between 10 degrees to 15 degrees, preferably at 15 degrees. Such limited angled positioning of the seat structure 5 with respect to the seat mounting structure 4 allows a comfortable position of the occupant to the neighboring, e.g. center sitting occupant of seat S2 or S5. This angled positioning, e.g. 15-degrees-angled positioning of the seat structure 5 with respect to the seat mounting structure 4 keeps the occupants line of sight on the center of the vehicle interior 3 across from them and not directly across into the eyes of occupants directly sitting across from them.

The seat structure 5 comprises the main frame 5.1 configured to mount different parts of a seat S, e.g. a seat pan SP, a backrest B and a headrest H. For instance, the main frame 5.1 comprises a lower frame part 5.1.1 for mounting a seat pan SP on it, a middle frame part 5.1.2 for mounting a backrest B and an upper frame part 5.1.3 for mounting a headrest H of the seat S. The main frame 5.1 could be further simplified by combining the backrest B and the seat pan SP into a mono-frame or one-piece frame. This one-piece frame as shown in the FIGS. 5A, 5B is designed and mounted into the vehicle 1 angled inwards 15 degrees from fore F and aft A to give the occupant more flexibility and overall comfort within their personal space. This angled positioning, e.g. 15-degree angled positioning, for each outboard seat S1, S3, S4 or S6 also creates an overall environment that is more conductive to a social space or coffee house on wheels.

The seat structure 5 has a plurality of tubes, in p'articular vertical bearing tubes 5.3 and/or cross holding tubes 5.4. In particular, two cross holding tubes 5.4 are arranged in the area of the lower frame part 5.1.1. The cross holding tubes 5.4 are being spaced from one another by an opening 5.5 in which auxiliary units 5.6, e.g. a spring pad 5.7, is arranged and hold onto the cross holding tubes 5.4 by hooks 5.8. The cross holding tubes 5.4 may also be used to arrange and hold the mounting element 6.1 and/or the detachable support members 6.2 of the seat rim structure 6.

The seat structure 5 can further comprise optional auxiliary carrier 5.9, e.g. mounting plates, ribs, panels to mount a belt or a loudspeaker or other electronic devices.

The seat structure 5 may further comprise as an extended auxiliary unit 5.6 an occupant support component 7.

The occupant support component 7 comprises at least a support element 7.1 comprising at least an L-shaped upper portion 7.2 and a U-shaped side portion 7.3. In particular, one of the legs 7.3.1 of the U-shaped portion 7.3 and one of the legs 7.2.1 of the L-shaped portion 7.2 are configured as an integral, merged part. The support element 7.1 is configured as one-piece part.

The L-shaped upper portion 7.2 is configured to be arranged on an upper surface US of a backrest B and the U-shaped side portion 7.3 is configured to be used as an armrest and which comprises a number of control devices.

In particular, the U-shaped portion 7.3 comprises integrated recesses to arrange and hold control device. For instance, the support element 7.1 is formed as wrap around shelf or rail-like element developed to accommodate an occupant and to provide an additional level of comfort be letting the occupant position his arm in a higher position compared to common armrest heights. Mounted control devices are, for instance, a so-called HMI device for seat control, venting ducts or heating devices and ambient/information LED-lighting devices. The control devices are positioned in an ideal location for an occupant of all sizes to access within reach. For example, the support element 7.1 is a 3D manufactured part, e.g by 3D printing process or injection moulding, into which the control devices are built or assembled.

FIG. 5B shows an alternative seat structure 5 configured as a main frame 5.1 without an occupant support component 7.

Figure 5C:
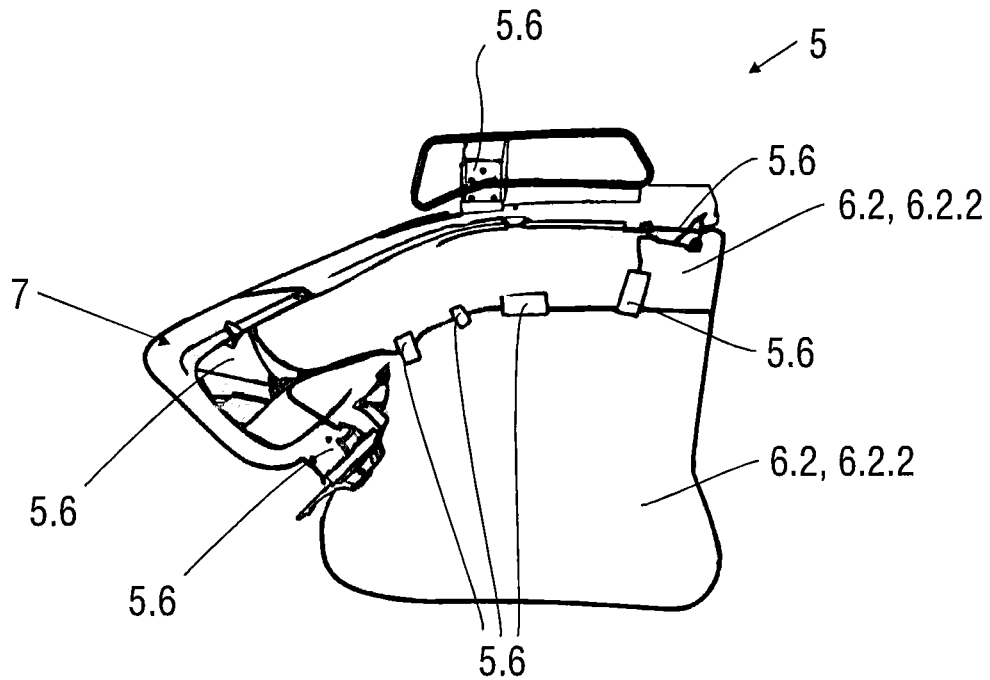
FIG. 5C shows a perspective view of a first embodiment of an occupant support component.

FIG. 5C shows a partial view of a seat structure 5 with pre-assembled support members 6.2 and pre-assembled occupant support component 7.

Auxiliary units 5.6, e.g. brackets for recliner mechanism, control units 10, cable guidances, belt, headrest structure, are assembled or integrated to the seat structure 5.

Figure 5D:
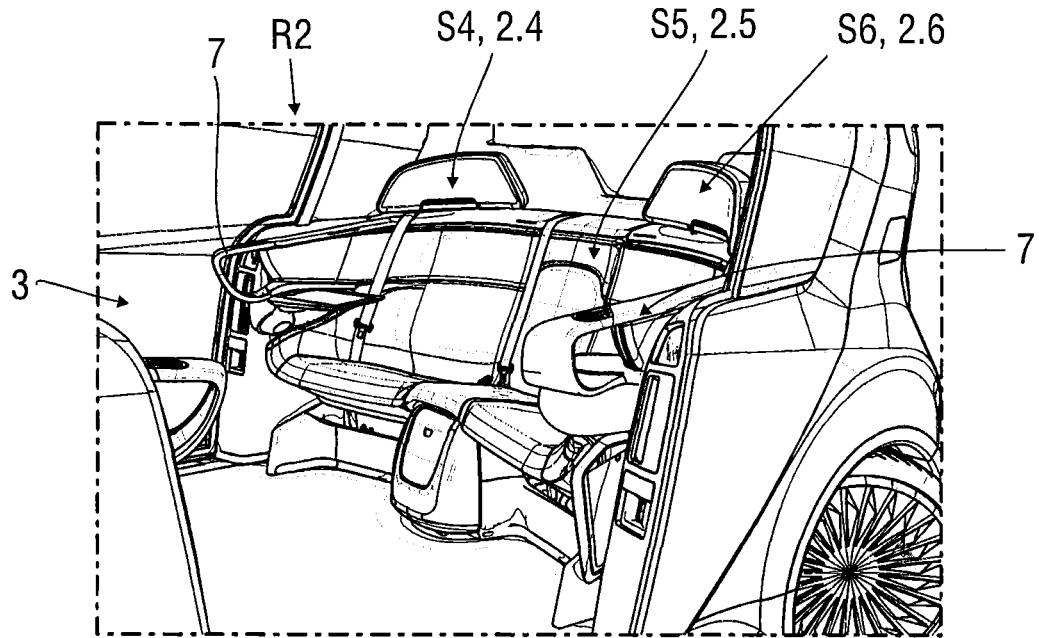
FIG. 5D shows a perspective view of a second embodiment of an occupant support component.

FIG. 5D shows a perspective view of the row R2 with the seats S4 to S6 and the occupant support component 7. The occupant support component 7 extends over the entire width of all seats S4 to S6 of the row R2 and laterally over the axial length along the outer lateral sides of each of the outer seats S4 and S6.

The occupant support component 7 is mounted to the seat structure 5. Alternatively or additionally, the occupant support component 7 may be mounted to vehicle interior structures and/or vehicle frame structures.

Figure 5E:
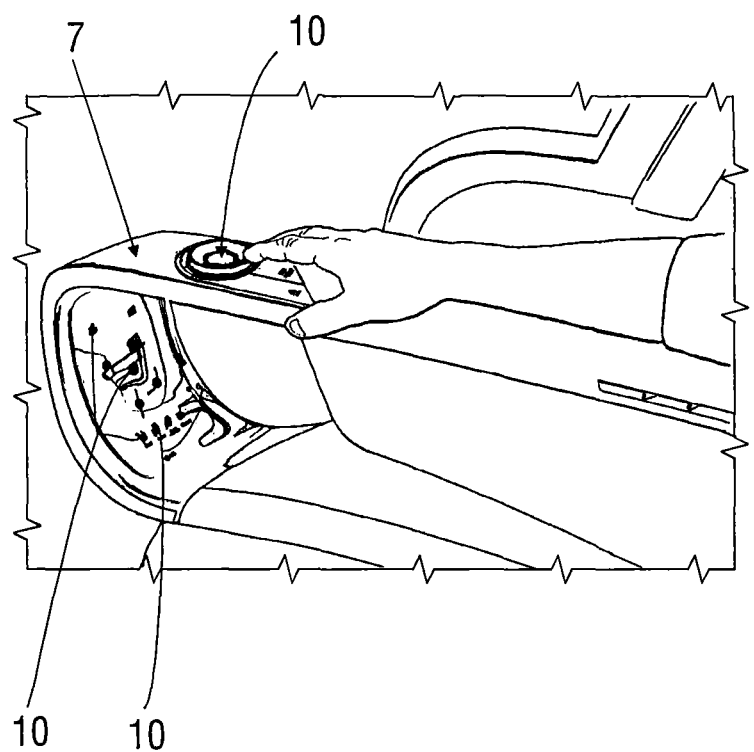
FIG. 5E shows a perspective view of a third embodiment of an occupant support component.

FIG. 5E shows an enlarged partial view of the occupant support component 7 in an assembled state with integrated control units 10, e.g. displays, control panels, control buttons.

Figure 6A:
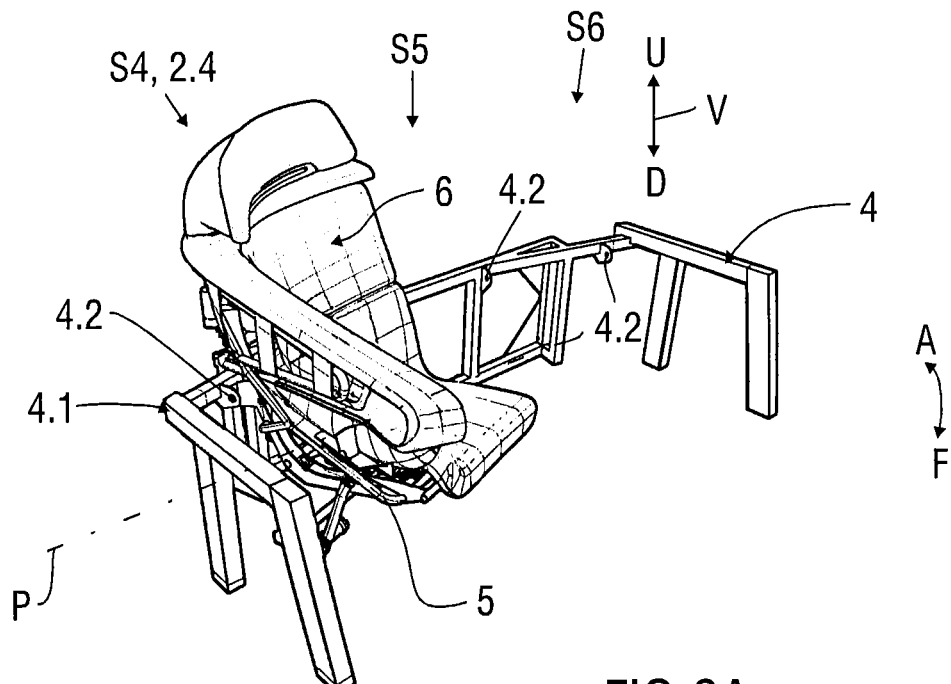
FIG. 6A shows a perspective view at angle from the front of the seat mounting structure having one mounted seat, in particular one seat structure mounted to a common seat mounting structure.
Figure 6B:
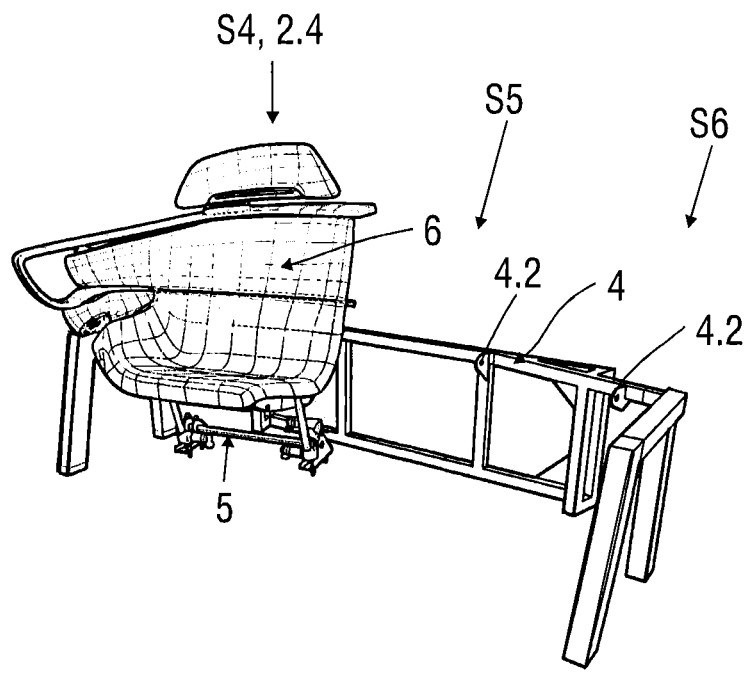
FIG. 6B shows a perspective view from the front of the seat mounting structure having one mounted seat, in particular one seat structure mounted to a common seat mounting structure.

FIGS. 6A, 6B show the main frame 5.1 of one single seat S fastened to the seat rib cage 4.1. The main frame 5.1 is fastened to the seat rib cage 4.1 by the seat mounting points 4.2 in such a manner that the seat structure 5 is relatively movable with respect to the seat rib cage 4.1 by the seat adjusting devices 4.6, e.g. in vertical direction V up U and down D or about a horizontal pivot axis P fore F and aft A.

Further seats S may be fastened to the seat rib cage 4.1 by the free seat mounting points 4.2.

The seat S shown in FIGS. 6A, 6B is pre-assembled by attaching the seat pre-assembled trim structure 6 to the seat structure 5 and both together to the seat mounting structure 4.

The seat mounting structure 4 is configured to mount at least one seat S as shown in FIGS. 6A, 6B.

Figure 6C:
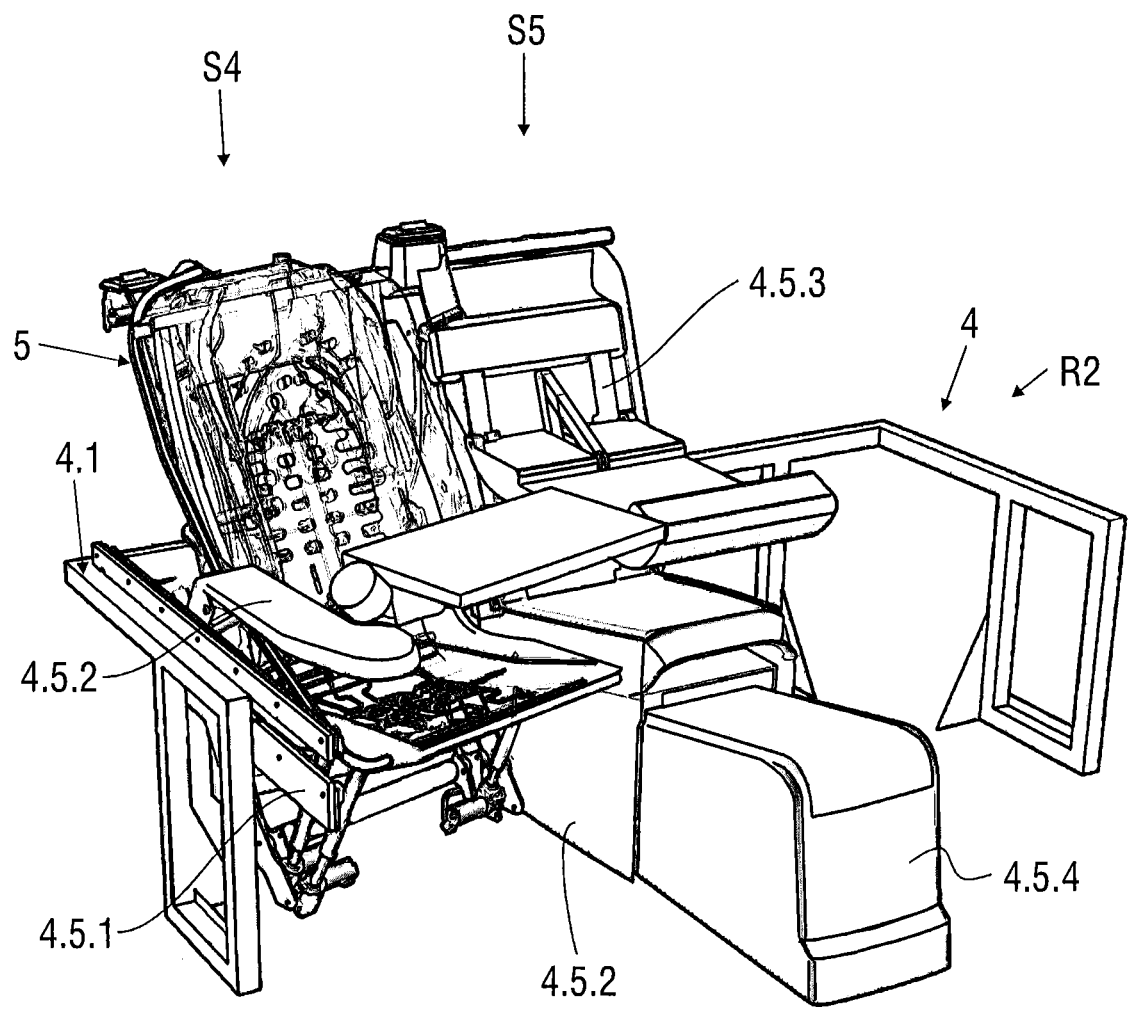
FIG. 6C shows a perspective view of an alternative embodiment of a seat mounting structure with assembled seat structures of an outer seat and a center seat.

FIG. 6C shows another exemplary embodiment of a seat mounting structure 4 with assembled seat structure 5 for the outer seat S4 and an assembled seat structure 5 for the center seat S5.

On the lateral side of the seat mounting structure 4 along the lateral side of the seat S4 the loading track assembly 4.5.1 is assembled to guide the seat assembly 2.4, in particular the respective seat structure 5 of seat S4, into an assembling position to assemble the seat S4 in a correct position onto the seat rib cage 4.1. The seat rib cage 4.1 can further comprise optional carriers 4.5.2, e.g. mounting plates, ribs, panels to mount an armrest, storage bin 4.5.4 (shown in a pull-out position), and/or optional center carriers 4.5.3 to mount the center seat S5.

The seat rib cage 4.1 is configured as a universal mounting structure for two or three seat assemblies 2.4 to 2.6 to provide different interior types 3.1 to 3.4.

The seat mounting structure 4 is configured to mount three seats S1 to S3 or S4 to S6 within the vehicle 1 to create one of the rows R1, R2, e.g. a rear row, center row and/or a front row. For example, the vehicle 1 is an autonomous driving vehicle configured to autonomously pick up and transport occupants, wherein the passenger compartment and vehicle interior 3, for instance, can be designed in a more comfortable and luxury way for the occupants, e.g. in different interior types 3.1 to 3.4 as shown in FIG. 7.

FIG. 7A shows the interior type 3.1, for instance a passenger compartment for a multi-occupant comfort seat arrangement 2 with two rows R1, R2 each of them having two seats S1, S2 and S3, S4. Each row R1 or R2 comprises one seat mounting structure 4 to detachably arrange and assemble the respective seats S1, S2 and S3, S4 within the vehicle interior 3. The seats S1, S2 and S3, S4 face each other. For instance, the FIG. 7A shows a front row R1 and a rear row R2 with usage of two the seat mounting structures 4, e.g. seat rib cage 4.1, for multi-occupant comfort. Each seat mounting structure 4 is further configured to hold storage units 8, e.g. vehicle batteries.

FIG. 7B shows the interior type 3.2, for instance a passenger compartment for a premium experience seat arrangement 2 with two convertible seats S1 to S2. The seats S1 and S2 are convertible from a seating position into a bed position. The seats S1, S2 are rotatably adjustable in a seating position. Each seat S1, S2 has its own unique mount bracket (=seat structure 5) but also ties into the universal seat mounting structure 4, e.g. universal seat rib cage 4.1.

FIG. 7C shows the interior type 3.3, for instance a passenger compartment for a multi-occupant basic economy seat arrangement 2 with three rows R1 to R3 each of them having three seats S1 to S3, S4 to S6 and S7 to S9. Each row R1 to R3 comprises one seat mounting structure 4 to detachably arrange and assemble the respective seats S1 to S3, S4 to S6 and S7 to S9 within the vehicle interior 3. The seats S1 to S9 face in the same direction.

FIG. 7D shows the interior type 3.4, for instance a cargo containment with a storage compartment 9 which is comparatively enlarged without any seat mounting structure 4. If full cargo space is not required, or for temporary cargo mode seat mounting structure 4 can remain in the vehicle 1 with no seats S attached. Mounting locations on seat mounting structure 4 can dock cargo containing devices. This interior type 3.4 allows reduction of the overall mass of the vehicle 1 when passengers are not on board due to removing of structural elements, e.g. all seat structures 5 from the seat mounting structure 4 and respective elements that protect and keep the passengers safe. Thus, the interior type 3.4 as a cargo mode provides an efficient cargo carrier.

Figure 8A:
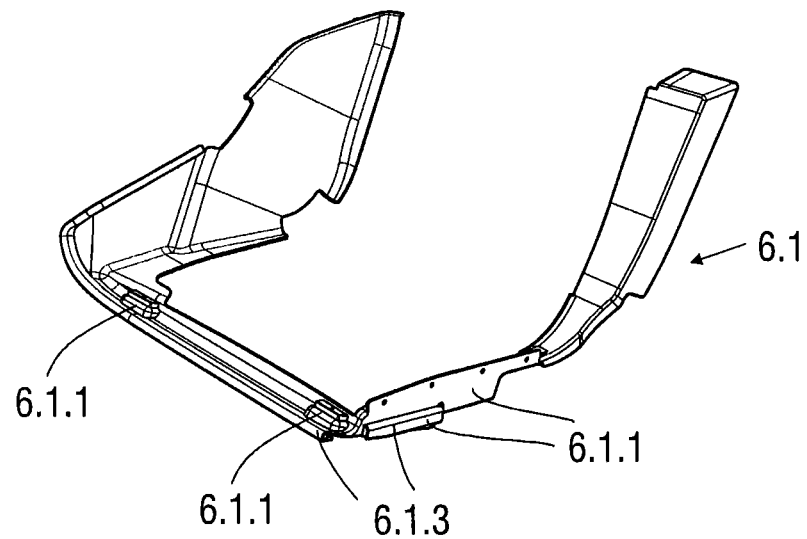
FIG. 8A shows a perspective front view of a mounting element, e.g. mounting substrate element, for seat trim structure of a vehicle seat.
Figure 8B:
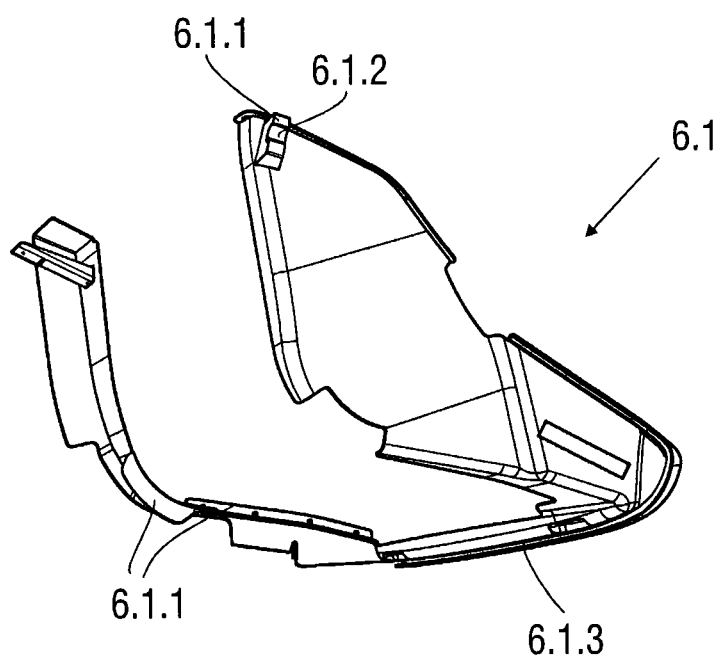
FIG. 8B shows a perspective rear view of a mounting element, e.g. mounting substrate element, for seat trim structure of a vehicle seat.

FIGS. 8A and 8B show a perspective view of an exemplary embodiment of a mounting element 6.1 of the seat trim structure 6 to detachably attach the trim element 6.3.

Further, the seat trim structure 6 comprises as the mounting element 6.1 e.g. a mounting substrate element which may produce by a 3D printing process or by an alternative process.

The mounting element 6.1 has a plurality of integrated retaining elements 6.1.1, such as retaining channels 6.1.2, wherein the mounting element 6.1 is detachable attached to the seat mounting structure 4, in particular to the main frame 5.1, e.g. to tubes.

Furthermore, the mounting element 6.1 comprises as integrated retaining elements 6.1.1 trim channels 6.1.3 which are configured to detachable retain a number of trim elements 6.3. For instance, the mounting element 6.1 is a removable trim shell skeleton for trim elements 6.3 such as trim cover elements or trim sub-assemblies of the vehicle seat S. The mounting element 6.1 can be exchanged without having to remove structural components of the seat S from a chassis or a floor of the vehicle 1. In particular, one of the trim elements 6.3 is detachably/releasably retained to the mounting element 6.1 by a retaining hook e.g. extension flaps, J-hooks configured to wrap around an edge/front bar of the seat S to retain within the trim channel 6.1.3.

The mounting element 6.1 may further comprise as integrated retaining elements 6.1.1 a number of retaining clips, a number of positioning pins 6.2.8, a number of retaining nuts, a number of retaining rails, a number of retaining screws, or clips.

The mounting element 6.1 provides enough structural integrity to be trimmed independent from the main frame 5.1. Multiple support members 6.2 and/or multiple trim elements 6.3 can be stacked and swapped out quickly by a (fleet) service provider when required. For example, the mounting element 6.1 is formed with a 3D-printing method integrating the trim retaining elements 6.1.1. The mounting element 6.1 comprises a shape corresponding with a shape of the main frame 5.1.

Figure 9A:
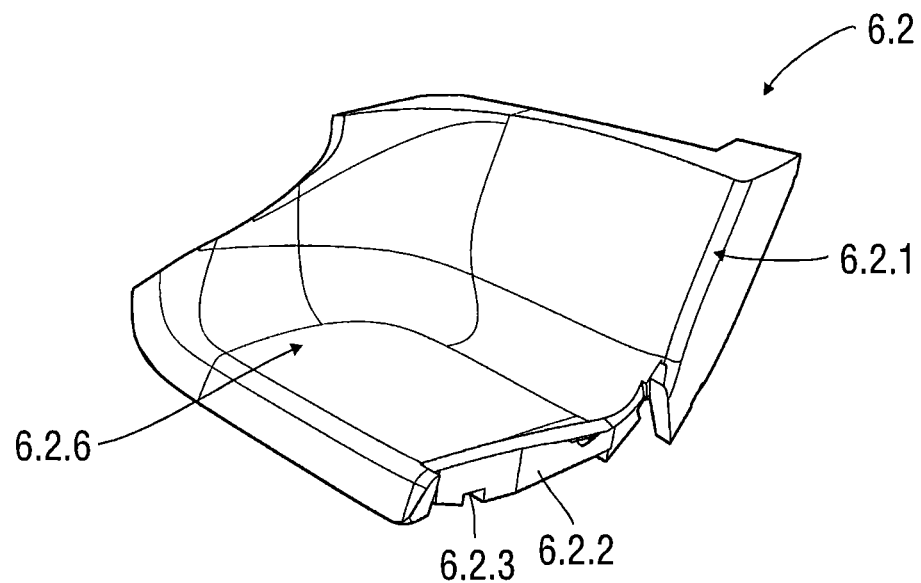
FIG. 9A shows a perspective front view of a support member, e.g. of detachable support shell made from foam, which sets into the mounting element (mounting substrate element) in FIGS. 8A, 8B in an assembled state shown in FIG. 10.
Figure 9B:
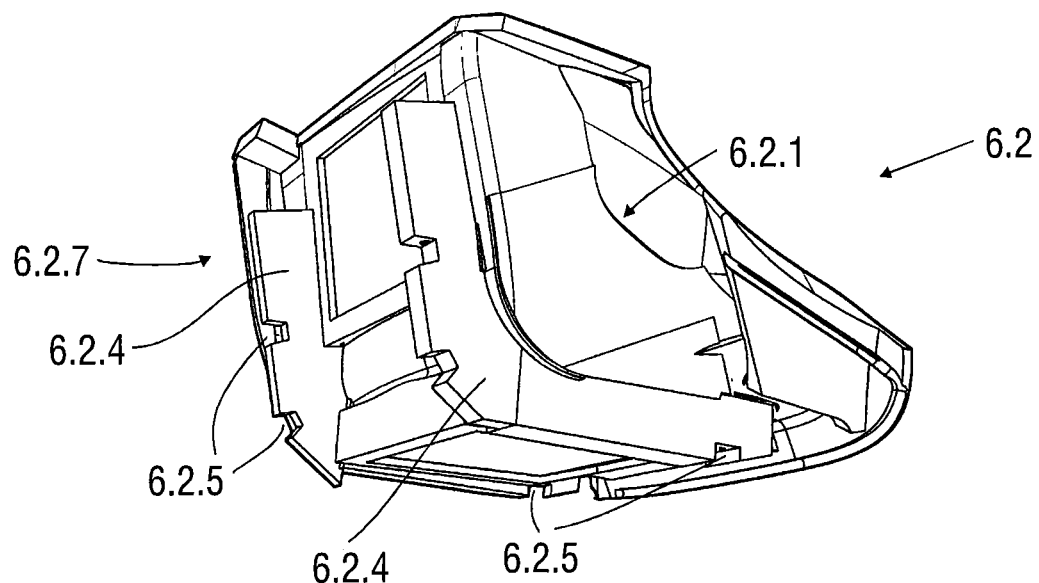
FIG. 9B shows a perspective rear view of a support member, e.g. of detachable support shell made from foam, which sets into the mounting element (mounting substrate element) in FIGS. 8A, 8B in an assembled state shown in FIG. 10.

FIGS. 9A and 9B show perspective views of one embodiment of a support member 6.2, e.g. a lower support member 6.2.1, which is detachable mountable to the mounting element 6.1 and/or the seat mounting structure 4.

The support member 6.2 is configured as a foam panel or foam pad, in particular such as a cushion panel or a cushion pad. The shown support member 6.2 is for instance a seat cushion panel or seat cushion pad which is loosely arranged on the mounting element 6.1 to simply replace or remove it.

On a front surface 6.2.6, the support member 6.2 has a curved shape to provide a seating surface. On a rear surface 6.2.7, the support member 6.2 comprises holding members 6.2.4, e.g. holding slots 6.2.5.

Figure 10:
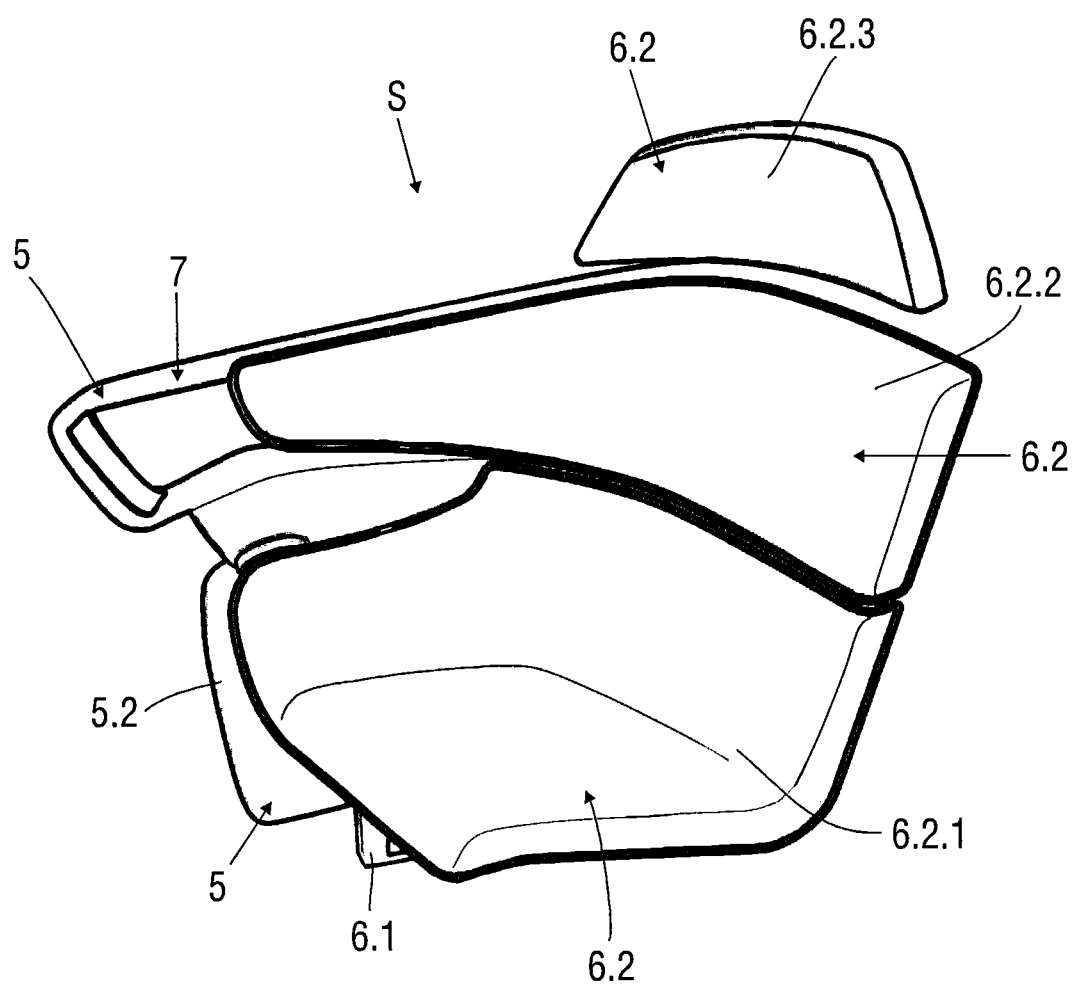
FIG. 10 shows a perspective view of a first embodiment of a support member which are arranged/arrangeable to the mounting element according to FIGS. 8A, 8B.

FIG. 10 shows a perspective view of an embodiment of a seat S with support members 6.2, e.g. lower, middle and upper support members 6.2.1 to 6.2.3, forming a seating surface for an occupant. The support members 6.2 are arranged to the mounting element 6.1 and the seat structure 5, in particular the main frame 5.1.

The support members 6.2 have seating surfaces having curved shapes. The curved shape allows multiple seating positions and particularly allows occupants to sit at 10 degrees to 20 degrees angle to moving direction of the vehicle 1 allowing interactions with other occupants, e.g. neighboring occupants or occupants sitting opposite, and/or privacy from occupants facing in opposite rows R1 of seats S1 to S3.

Figure 11A:
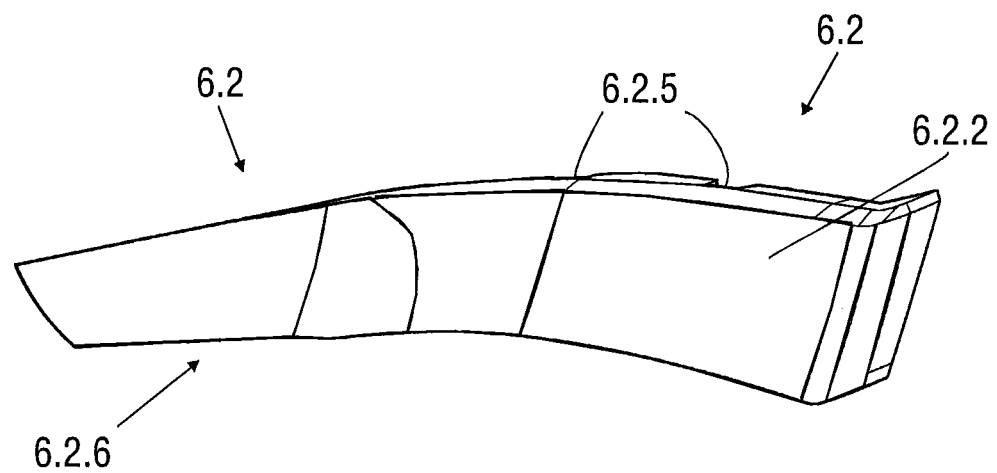
FIG. 11A shows a perspective front view of a second embodiment of a support member which are arranged/arrangeable to the mounting element according to FIGS. 8A, 8B.
Figure 11B:
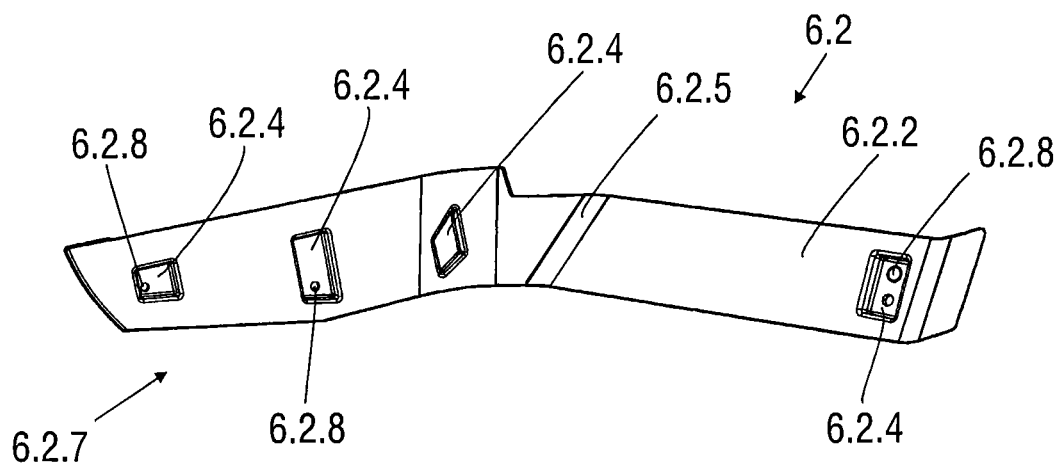
FIG. 11B shows a perspective rear view of the second embodiment of a support member which are arranged/arrangeable to the mounting element according to FIGS. 8A, 8B.

FIGS. 11A and 11B show perspective views of another embodiment of a support member 6.2 e.g. of a middle support member 6.2.2. The middle support member 6.2.2 is an extended foam pad to form a cushion pad in a shoulder area of an occupant of the seat S. The support member 6.2 extends along a backside of the seat S and laterally in a lengthwise direction, from back to front, of the seat S to partially capsule the occupant. Such an extension of the support member 6.2 allows integration of operating elements, electronic devices, e.g. push buttons, displays. Due to the comfortable height of the middle support member 6.2.2 the electronic devices may be easy and ergonomically operated by an occupant.

On a front surface 6.2.6, the middle support member 6.2.2 has a curved shape or profile to provide an ergonomic seating surface. On a rear surface 6.2.7, the support member 6.2 comprises holding members 6.2.4, e.g. holding slots 6.2.5, and positioning pins 6.2.8 for prepositioning or prearranging the middle support member 6.2.2 onto the mounting element 6.1 and/or the support structure 5.

Figure 12:
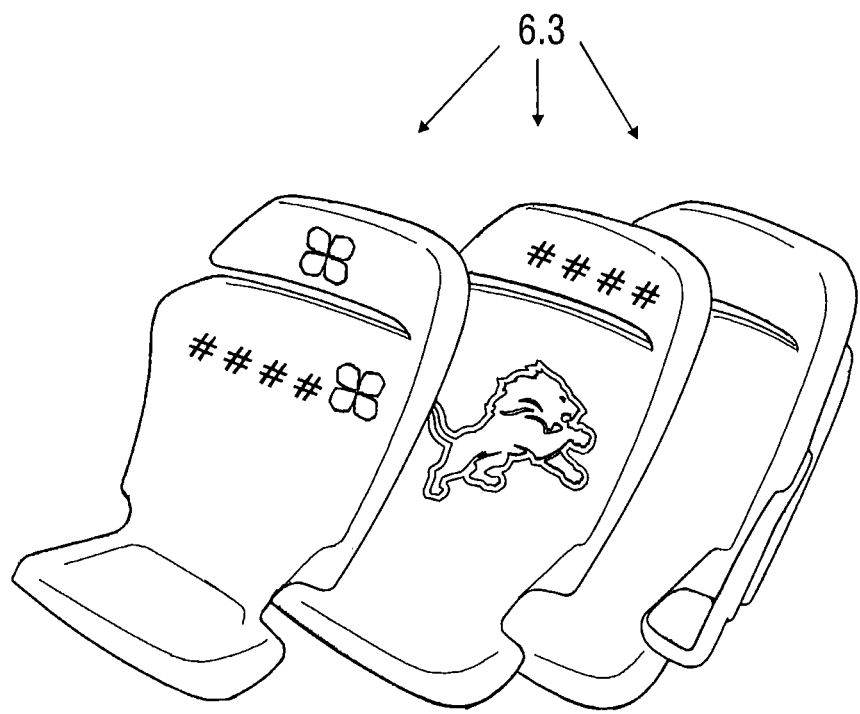
FIG. 12 shows a perspective view of detachable trim elements, e.g. detachable trim shell.

FIG. 12 shows a perspective view of detachable and interchangeable trim elements 6.3, e.g. from the detachable support member 6.2 (e.g. trim support substrate) and the mounting element 6.1 (e.g. trim mounting substrate).

Each of the trim elements 6.3 is configured as a trim cover having a curved profile. Each of the trim elements 6.3 is one-piece trim cover for a seat S forming a common seat cushion trim cover, a seat back trim cover and a head restraint cover. Each of the trim elements 6.3 comprises a material of one or more of a vinyl, fabric, and/or leather.

One of the trim elements 6.3 is retained on the mounting element 6.1 such that the at least one support member 6.2 is fixedly held on the mounting element 6.1. For example, the support member 6.2 is loosely arranged on the mounting element 6.1. The support member 6.2 sits on the mounting element 6.1 when arranged on the mounting element 6.1. The trim element 6.3 is arranged on the support member 6.2, e.g. wrapped over, and is attached to the mounting element 6.1 by hooks arranged within the trim channels 6.1.3. The trim element 6.3 as well as the support member 6.2 is simply removable from the mounting element 6.1 to individualize or customize the respective seat S4, e.g. by different prints or watermarks onto a front surface 6.2.6 of different trim elements 6.3. For instance, the support member 6.2 is removable after the trim element 6.3 is detached from the mounting element 6.1.

LIST OF REFERENCES 1 vehicle
2 seat arrangement
2.1 to 2.6, 2.n seat assembly
3 vehicle interior
3.1 to 3.4 interior type
4 seat mounting structure
4.1 seat rib cage
4.2 seat mounting point
4.3 mounting element
4.4 vehicle structure mounting point 4.5 mounting location
4.5.1 loading track assembly
4.5.2 carrier
4.5.3 center carrier
4.5.4 storage bin
4.6 seat adjusting device
4.7 rib
4.8 cross base frame
5 seat structure
5.1 main frame
5.1.1 lower frame part
5.1.2 middle frame part
5.1.3 upper frame part
5.2 frame element
5.3 vertical bearing tube
5.4 cross holding tube
5.5 opening
5.6 auxiliary unit
5.7 spring pad
5.8 hook
5.9 auxiliary carrier
6 seat trim structure
6.1 mounting element
6.1.1 retaining element
6.1.2 retaining channel
6.1.3 trim channel
6.2 support member
6.2.1 lower support member
6.2.2 middle support member
6.2.3 upper support member
6.2.4 holding member
6.2.5 holding slot
6.2.6 front surface
6.2.7 rear surface
6.2.8 positioning pin
6.3 trim element
6.3.1 lower trim element
6.3.2 middle trim element
6.3.3 upper trim element,
7 occupant support component
7.1 support element
7.2 L-shaped upper portion
7.2.1 leg of L-shaped upper portion
7.3 U-shaped side portion
7.3.1 leg of U-shaped side portion
8 storage unit
9 storage compartment
10 control unit
A aft
B backrest
D down
F fore
H headrest
P horizontal pivot axis
R1 to R3 row
S, S1 to S9 seat
SP seat pan
U up
US upper surface of backrest
V vertical direction

The invention claimed is:

1. A seat trim structure for a vehicle seat, comprising at least:
a mounting element configured to be placed onto a seat structure having a plurality of integrated retaining elements,
a number of detachable support members, and
a number of detachable trim elements,
wherein the number of support members is detachably arranged on the mounting element and wherein the integrated retaining elements are configured to detachably attach the number of trim elements to the mounting element, wherein said retaining elements comprise integrated trim channels arranged on an edge side of the mounting element and on a side facing away from a seating surface side, wherein the trim channels are configured to detachably attach the number of detachable trim elements to the mounting element, wherein the number of support members is fixedly held between the mounting element and the trim element.

2. The seat trim structure according to claim 1, wherein the mounting element is configured as a mounting substrate element produced by a 3D printing process.

3. The seat trim structure according to claim 1, wherein the integrated retaining elements of the mounting element comprise a retaining channel or a number of positioning pins.

4. The seat trim structure according to claim 3, wherein at least one of the trim elements is detachably retained to the mounting element by a retaining hook which is detachably retained to one of the retaining channel or to the trim channel.

5. The seat trim structure according to claim 1, wherein said seat structure comprises a main frame formed by a plurality of frame elements, wherein at least one of the frame elements is configured to be variably extendable.

6. The seat trim structure according to claim 1, wherein at least one the support members comprises a rear surface and a front surface wherein said rear surface is arranged on a front surface of the mounting element and a rear surface of at least one of the trim elements is arranged on the front surface of the support members.

7. The seat trim structure according to claim 1, wherein at least one of the number of detachable support members is configured as a foam panel or foam pad.

8. The seat trim structure according to claim 1, wherein at least one of the number of detachable support members is one of a seat cushion panel, a seat cushion pad, a seat back cushion panel, a seat back cushion pad, a head restraint cushion panel, a head restraint cushion pad, an armrest cushion panel, an armrest cushion pad, a lower seat cushion panel, an upper seat cushion panel.

9. The seat trim structure according to claim 1, wherein at least one of the number of detachable trim elements is configured as a trim cover having a curved profile.

10. The seat trim structure according to claim 1, wherein at least one of the number of detachable trim elements is one of a seat cushion trim cover, a seat back trim cover, a seat back panel, a seat back pocket, a head restraint cover, an armrest cover, a table cover, or a seat belt pocket.

11. The seat trim structure according to claim 1, wherein at least one of the number of trim elements comprises a material of one or more of a vinyl, fabric, and/or leather.

12. The seat trim structure according to claim 1, wherein at least one of the number of the trim elements or the support member has a seating surface having a curved shape.

13. A seat structure for a vehicle seat, comprising at least:
a main frame and a seat trim structure,
wherein the seat trim structure comprising at least a mounting element having a plurality of integrated retaining elements, a number of detachable support members, and a number of detachable trim elements,
wherein the number of the support members is detachably arranged on the mounting element and wherein the integrated retaining elements are configured to detachably attach the number of trim elements to the mounting element, and wherein the seat trim structure is detachably attached to the main frame, wherein said retaining elements comprise integrated trim channels arranged on an edge side of the mounting element on a side facing away from a seating surface side, wherein the trim channels are configured to detachably attach the number of detachable trim elements to the mounting element, wherein the number of support members is fixedly held between the mounting element and the trim element.

14. The seat structure according to claim 13, wherein the seat trim structure is detachably attached to the main frame by at least one of a screw connection or clip connection.

15. The seat structure according to claim 13, wherein the main frame is configured at least as a seat supporting frame made of at least one of metal or composite material.

16. The seat structure according to claim 13, wherein the main frame comprises a plurality of frame elements configured as at least one rib.

17. The seat structure according to claim 16, wherein at least one of the plurality of frame elements is linearly movable and extendable.

* * * * *